June 21, 1927.  M. WATTER  1,632,811
APPARATUS FOR FLYING
Original Filed April 25, 1922   2 Sheets-Sheet 2
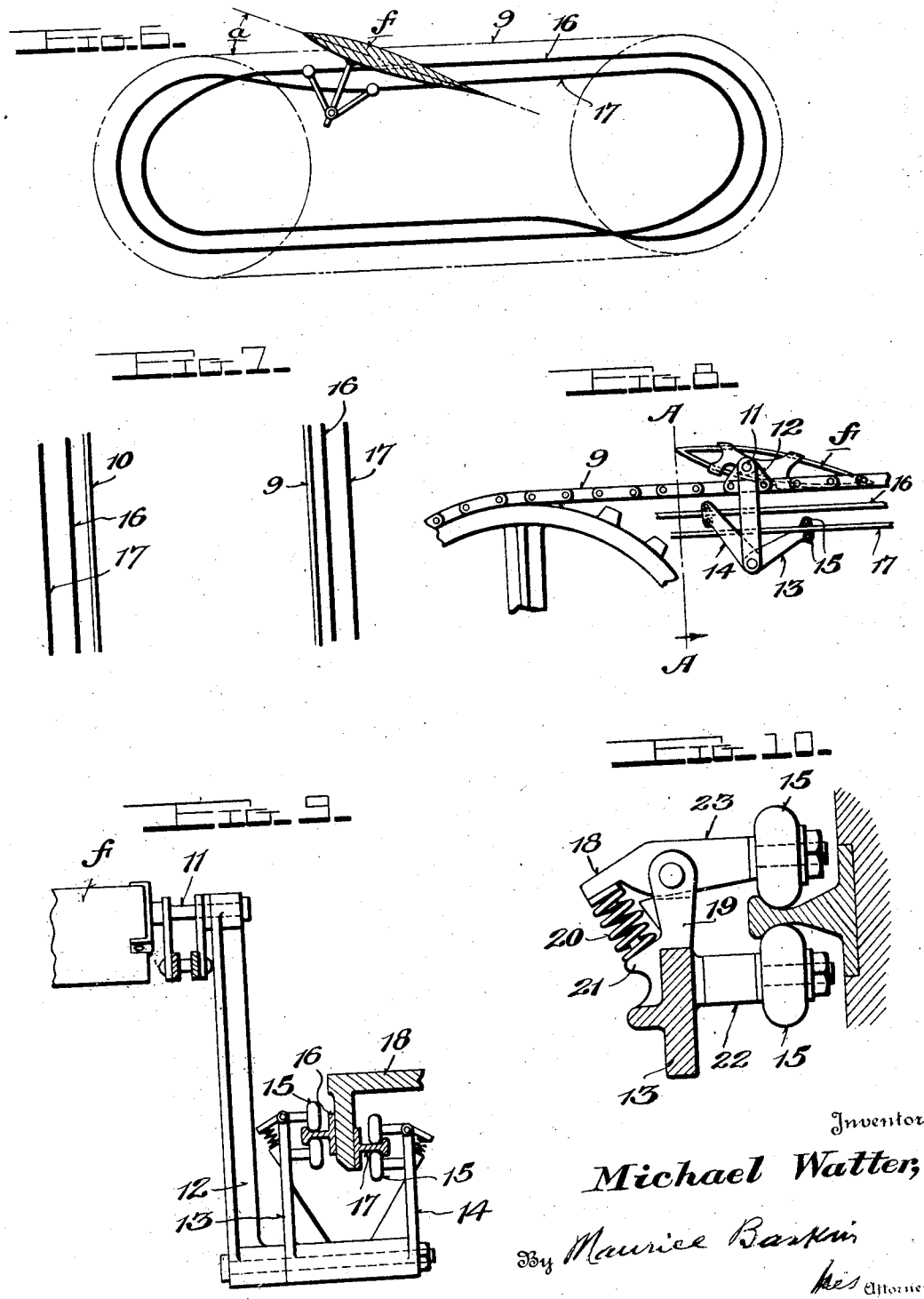

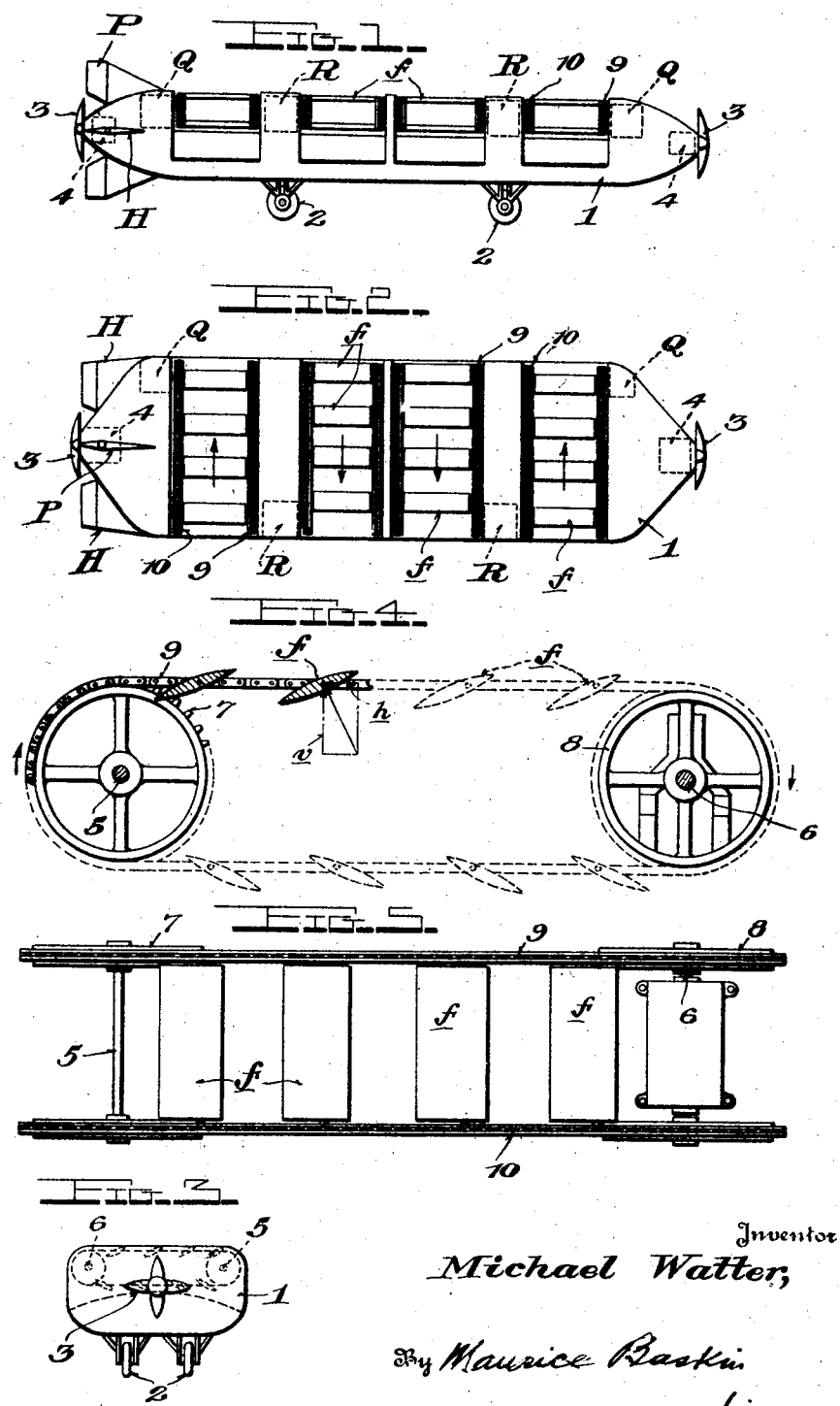

Patented June 21, 1927.

1,632,811

UNITED STATES PATENT OFFICE.

MICHAEL WATTER, OF NEW YORK, N. Y., ASSIGNOR OF ONE-FOURTH TO MAURICE BASKIN AND ONE-FOURTH TO MAX RHOADE, BOTH OF WASHINGTON, DISTRICT OF COLUMBIA.

APPARATUS FOR FLYING.

Refile for abandoned application Serial No. 557,161, filed April 25, 1922. This application filed June 23, 1926. Serial No. 118,130.

This application discloses the same subject matter as that in application No. 557,161, filed April 25, 1922, and abandoned March 19, 1926.

My invention relates to flying machines, and more specifically to that type of aeroplane or flying machine which is heavier than air. The principal object of the present invention is to construct a flying machine which will be able to rise from the ground in a vertical or nearly vertical direction, to hover or remain stationary when in the air in any desired position and to effect a landing in a comparatively small space.

My invention generally consists of one or more planes or wings of appropriate shape and size, mounted to move in a rectilinear direction, the axis of the plane of said wing remaining at the same time at a certain fixed angle to the line of motion of the said plane (angle of attack).

In the drawing: Fig. 1 represents a longitudinal elevation of a flying machine embodying my invention. Fig. 2 is a top plan view of the machine shown in Fig. 1. Fig. 3 is a front elevation of the device. Fig. 4 is a diagrammatic outline of the moving planes or wings, including the sprocket chains and wheels on which they are mounted. Fig. 5 is a plan view of structure in Fig. 4. Fig. 6 is a diagrammatic view of the arrangement of rails and wing supports for directing the movable wings in their proper path. Fig. 7 is a front elevation of Fig. 6. Fig. 8 is a detail view of the means for supporting the wings on the chains and rails. Fig. 9 is a sectional view along the line A—A in Fig. 8. Fig. 10 is a detail view of the roller wheels and rails directing the wing supports.

The machine consists of the aeroplane body (1) provided with landing wheels (2) or other similar device appropriate for the purpose and with the ordinary propellers (3) driven by motors (4) and directing planes H and P.

Mounted longitudinally of the body (1) are two long shafts (5) and (6) carrying one or more pairs sprocket wheels (7) and (8) carrying the endless chains (9) and (10). Chains (9) and (10) have mounted on them one or more planes or wings of the proper design and construction. The said planes are set at the appropriate angle to the lines of travel of the chains (9) and (10). The shafts (5) and (6) may be propelled by motors (4) and (4) or may be connected by appropriate means of transmission to the motors operating the propellers.

In operation, the sprocket wheels (8—8) are revolved at the required rate of speed carrying the wings (f) in the direction indicated by the arrows. The impact of air against these wings produces a force of which the horizontal component ($h$) of the said force tends to drive the plane horizontally while the vertical component ($v$) tends to move the same upwardly. The sets of planes are arranged in such a manner that while one set moves in one direction the other set of planes moves in the opposite direction, as indicated by the arrows in Fig. 2. The horizontal component ($h$) is thus neutralized and the vertical component ($v$) will lift the machine vertically when the planes are driven with the proper velocity.

The planes or wings ($f$) may be mounted for movement on the sprocket chains (9) in any appropriate manner. A practical method, however, for accomplishing the above result is illustrated in Figs. 6 to 10, inclusive. The planes are mounted on trunnions (11) pivoted in the plates (12). These plates are triangular in form and are provided with two openings at both ends of the base of the triangle, through which studs are passed connecting the said plate to the two adjoining links in the chains (9). The said plates (12) thus constitute a link in the chain (9). The planes ($f$) are mounted rigidly on the trunnions (11), which trunnions project outwardly from the sprocket chains. These projecting ends have rigidly mounted thereon the links (12) having two projecting arms (13) and (14). These arms are rigidly connected to the links (12) and should preferably be an integral steel forging, or otherwise solidly welded to the link (12).

Each of the links (13) and (14) carry on their projecting ends a pair of rollers (15) which glide over the guiding rails (16—17) rigidly attached to the supports (18) which may be mounted on the frame of the machine in any appropriate manner.

The guiding rails (16—17) form endless loops which parallel the endless sprocket chains (9—10) and are located one above the other as shown in Figs. 6 and 7, and the arms (13) and (14) are so proportioned as to keep plane (*f*) at a predetermined fixed angle (*a*) to the line of movement of the chains.

The above arrangement of the guide rails and wing supports is such that the angle between the plane "*f*" and the line of motion of its trunnions remains constant practically throughout its path, including the end loops, and these loops are so proportioned as to produce a counteracting force to the centrifugal force of the mass of the wing. For this purpose, loops of the endless guide rails are formed in a curve known as a cubical parabola, which is of general parabolic shape with a gradually decreasing radius of curvature. During the movement of the guide links around the rails the planes of the wings make a rapid turn around their axis, due to the change of radius of curvature. This rapid turn develops very considerable air resistance, which is in the direction towards the center or focus of the loop, and such air resistance counterbalances the centrifugal force exerted outwardly by the linear motion of the wings.

As shown in Figure 6, the rails 16 and 17 form closed loops at their ends, which loops form a continuous curve. These curves are so constructed and arranged, that when the wings "*f*" make a turn at a high rate of speed around the sprocket wheels 7 and 8, the centrifugal force acquired by the said wings during the rapid linear movement is largely counterbalanced by the force generated by the revolution of the said wing about its axis in following around the periphery of the said sprocket wheels. It will be noted from inspection of Figure 4, that there is a force F which is the resultant of the two forces *h* and *v* acting on the wing during its travel in the air. The two directing links "13" and "14" keep the wing *f* at the fixed angle *a* with the line of travel of the pivot 11 of the said wing. The same angle *a* is maintained by the wing during its travel around the sprocket wheels due to the special construction and curvature of the rail loops "16" and "17".

Since the wings *f* must necessarily travel at a very high rate of speed, the centrifugal force generated during the revolution of these wings around the sprocket wheels, is of very considerable magnitude, and would tend to carry the wings away from the center of said sprocket wheels on a tangential line. To overcome this centrifugal force, the rail loops are designed in such a form as to cause the force acting on the wing due to its rotation about its own center 11, which force is practically equivalent to the lift force F, to counterbalance the said centrifugal force, and thereby the strains due to the rotation of the wing around the wheels are practically neutralized or reduced to a very nominal figure. This result is accomplished by curving the rail loops in the form of a cubical parabola, whose radius of curvature is such as to maintain the plane of said wing at the desired angle to its line of motion at all times, so as to produce the necessary force technically known as lift to counterbalance the said centrifugal force.

Since the movement of the wings, and consequently the links and rollers (15) must necessarily take place at a very high rate of speed it may be advisable to provide a slightly yieldable support for one of each of the pairs of rollers (15). This may be accomplished by the structure shown in Fig. 10. As is clearly shown in the drawing one of the rollers (15) is mounted on a stud (16) rigidly fixed to the arms (13) or (14), while the other roller (15) is mounted on a stud (17) having a projection (18) and pivoted at about midways of its length on a clevis (19) projecting from the arm (13). A stout spring (20) is inserted between the projection (18) and a shoulder (21) on the arm (13), the said spring yielding slightly and absorbing all shocks which may be caused by slight ridges in the rail surfaces or during the rapid changes of direction by the wings in passing around the sprocket wheels.

The device heretofore described is of course capable of many modifications, which are included in the scope of the present invention. Thus, for example, the gliding wings or planes may be arranged longitudinally of the frame, instead of transversely, as shown in the drawing. The gliding wings may be utilized to sustain the machine in the air, while the propellers will be used to propel the same horizontally, or the machine may be provided with the ordinary stationary planes, while the gliding wings are used only for rising or descending vertically, or hovering in the air over any desired spot.

The machine may also be mounted on buoys or floats, so as to be able to rise or land upon the surface of the water, etc.

Having thus described my invention, what I claim and desire to secure by Letters Patent is as follows:

1. In a flying machine, a combination of a frame, a motor mounted thereon, a shaft directly connected to said motor and running longitudinally of said frame, sprocket wheels mounted on said shaft, endless chains operated by said wheels, said chains carrying a series of wings, a pair of closed loop rails, the side loop having a gradually diminishing radius of curvature paralleling said chains, the said wings being moved by the said chains in a linear direction and held at a fixed angle for the purpose of imparting a vertical lifting motion to the said machine, and a screw propeller located in front of said frame, for providing forward motion to said machine.

2. In a device of the character described, a motor, a shaft connected thereto, said shaft carrying two sprocket wheels, sprocket chains carrying a series of wings mounted on trunnions, two endless rails located in planes parallel to the said chains, the side rails having looped ends, forming a parabolic curve, and rising one above the other at the ends, links rigidly connected to said trunnions at one end thereof, the other end of said links being arranged to slide or roll over the said rails, said links and rails cooperating to keep the plane of the said wings at a certain fixed angle to their line of travel during their linear motion.

3. In a flying machine, the combination of a pair of longitudinal shafts carrying a series of sprocket wheels, a pair of sprocket chains operated by said wheels, a series of wings pivotally mounted on trunnions in said chains, links rigidly connected to said trunnions, said links having two projections at their lower ends, a pair of rails forming closed parabolic loops and placed alongside said chains, the said projections straddling the said rails and holding the said wings in a certain fixed position with respect to the line of travel of said trunnions.

4. In a flying machine, a combination of a wing mounted on trunnions in a pair of sprocket chains, a directing link rigidly connected to said trunnions and having projections at its lower ends, a pair of directing rails forming endless loops on each side of the said wings, the said projections having rollers at their ends straddling the said rails, the said loops being so constructed and arranged that the force generated by the wings during their travel around the said loops is counter-balanced by the centrifugal force.

5. In a device of the character described, a combination of two shafts each carrying a pair of sprocket wheels, chains carried by said wheels, a wing pivotally mounted on said chains, and having trunnions projecting beyond said chains at either end thereof, links rigidly connected to said projections, said links having rollers at their lower ends, rails forming endless loops and arranged in a plane parallel to said chains, said rollers being arranged to slide over said rails, the curvature of said loops being arranged to form a cubical parabola, so as to maintain the plane of the wing at a certain fixed angle to the chain during its travel around the periphery of said wheels.

6. In combination, a frame, two shafts mounted longitudinally on said frame, motors directly connected to said shafts, a series of wings mounted on said chains and traveling transversely off said frame, the said two shafts being rotated by the said motors in a direction opposite from one another, and a pair of looped rails having their ends forming a curve with a gradually diminishing radius of curvature located on each side of the said wings, to direct the said wings during their travel.

7. In a device of the character described, two sprocket chains parallel to each other, a wing mounted on trunnions on said chains, a link rigidly connected to each of the said trunnions 2, endless rails located in planes parallel to each of said chains, a pair of rollers attached to said link and adjusted to roll over said rail, means for imparting linear motion to the said chains and wings, and means for causing one end of said link to slide or roll along the said rails, thus maintaining the said wing at a certain fixed angle to the line of movement of the said chains during their linear motion.

8. In a device of the character described, a pair of endless chains mounted parallel to each other, a pair of rails, forming closed parabolic loops and located in planes paralleling said chains, a plane or wing mounted on trunnions inserted in some of the links of the said chains, a link rigidly connected to one of the said trunnions at one end thereof, arms projecting from the other end of the said link, the said arms each carrying a pair of rollers at their ends and the said rollers straddling the said rails, thus maintaining the said wings at a certain fixed angle to the line of movement of the said chains during their linear motion.

9. In combination, a plane, trunnions projecting from said plane, a link rigidly connected to one of said trunnions, said link carrying arms at its lower end, a pair of rollers carried at the end of each of the said arms, one roller of each of said pair being yieldably mounted on the said arm.

In testimony whereof I affix my signature.

MICHAEL WATTER.